(12) United States Patent
Hanlon et al.

(10) Patent No.: US 8,436,916 B2
(45) Date of Patent: May 7, 2013

(54) REMOVABLE DATA STORAGE DEVICE WITH INTERFACE TO RECEIVE IMAGE CONTENT FROM A CAMERA

(75) Inventors: Jason Patrick Hanlon, Scotts Valley, CA (US); Fabrice Jogand-Coulomb, San Carlos, CA (US)

(73) Assignee: Sandisk Technologies Inc., Plano, TX (US)

( * ) Notice: Subject to any disclaimer, the term of this patent is extended or adjusted under 35 U.S.C. 154(b) by 0 days.

(21) Appl. No.: 13/614,801

(22) Filed: Sep. 13, 2012

(65) Prior Publication Data

US 2013/0002904 A1 Jan. 3, 2013

Related U.S. Application Data

(62) Division of application No. 12/495,281, filed on Jun. 30, 2009, now Pat. No. 8,289,418.

(51) Int. Cl.
*H04N 5/76* (2006.01)
(52) U.S. Cl.
USPC ................ 348/231.99; 348/207.2; 348/222.1
(58) Field of Classification Search ............... 348/207.2, 348/222.1, 239.99, 231.6
See application file for complete search history.

(56) References Cited

U.S. PATENT DOCUMENTS

| | | |
|---|---|---|
| 6,952,222 B2 | 10/2005 | Sekine |
| 7,136,094 B2 | 11/2006 | Ziemkowski |
| 2002/0054224 A1 | 5/2002 | Wasula et al. |
| 2004/0080767 A1 | 4/2004 | Meilstrup et al. |
| 2004/0179135 A1 | 9/2004 | Battles et al. |
| 2004/0193571 A1 | 9/2004 | Barrus et al. |
| 2006/0171695 A1 | 8/2006 | Jung et al. |
| 2006/0176506 A1 | 8/2006 | Lin et al. |
| 2007/0024902 A1 | 2/2007 | Kato |
| 2007/0064111 A1 | 3/2007 | Ikehata et al. |
| 2007/0133042 A1 | 6/2007 | Park |
| 2007/0209023 A1 | 9/2007 | Nakagawa et al. |
| 2008/0101272 A1 | 5/2008 | Hayes et al. |

OTHER PUBLICATIONS

Notice of Allowance and Fee(s) Due mailed Jun. 27, 2012 in U.S. Appl. No. 12/495,281, 7 pages.
Non-Final Office Action mailed Jan. 27, 2012 in U.S. Appl. No. 12/495,281, 5 pages
Restriction Requirement mailed Oct. 24, 2011 in U.S. Appl. No. 12/495,281, 5 pages.

*Primary Examiner* — Gevell Selby
(74) *Attorney, Agent, or Firm* — Toler Law Group, PC

(57) ABSTRACT

A data storage device includes an interface removably connectable to a camera to receive from the camera image content in a first format, where the image content is received at the interface from the camera when the camera is operating in a print mode. The data storage device also includes a processor coupled to the interface. The processor processes the received image content in the first format to generate converted image content in a second format. The data storage device also includes a non-volatile memory to store the converted image content in the second format. The data storage device also includes a second interface to a second electronic device. The second interface selectively outputs the image content in the second format to the second electronic device. The data storage device emulates a printer via the interface.

14 Claims, 6 Drawing Sheets

REMOVABLE DATA STORAGE DEVICE WITH INTERFACE TO RECEIVE IMAGE CONTENT FROM A CAMERA

REFERENCE TO EARLIER-FILED APPLICATIONS

This patent application is a divisional of and claims priority from U.S. patent application Ser. No. 12/495,281 filed Jun. 30, 2009, the contents of which is incorporated by reference herein in its entirety.

FIELD OF THE DISCLOSURE

The present disclosure is generally related to a data storage device.

BACKGROUND

Non-volatile semiconductor memory devices, such as removable storage cards or universal serial bus (USB) flash memory devices, have enabled increased portability of data and software applications. However, a user of a digital camera or other electronic device that is configured to take digital pictures may find it difficult to share digital images at the time a picture is taken. For example, the user may want to share an image captured at an event with another user of a digital camera while at the event and without first uploading the digital images to the Internet or to a personal computer.

SUMMARY

Systems and methods of receiving image content received from a camera in a first format and storing converted image content in a second format are disclosed. A data storage device includes an interface, such as a universal serial bus (USB) interface. The data storage device receives image content, such as a digital photograph, in a first format from a camera operating in a print mode, generates converted image content in a second format, and stores the converted image content in the second format in a non-volatile memory. The interface is removably connectable to the camera, enabling a user to share the digital photograph with another user of an electronic device, such as a second digital camera.

DETAILED DESCRIPTION

Data storage devices and methods are disclosed to enable a photograph to be stored and transferred from a digital camera to a destination device such as another digital camera or another electronic device, such as a media player or a wireless telephone. The transfer is performed by coupling the data storage device to a non-volatile memory device interface or a data communications interface on the digital camera. The data storage device emulates a printer so that, by using a print function of the digital camera, image data is transferred from the digital camera to the data storage device as though the captured image were being printed from the digital camera. The data storage device converts the image data into a second format for transfer to the destination device and stores the converted image data in a memory of the data storage device. The data storage device may emulate a host device coupled to the destination device to transfer the converted image data to a memory of the destination device. The data storage device enables images to be transferred between two digital cameras or from a digital camera to another device. Photographs may thus be shared without printing and without transmission via e-mail or electronic messaging.

Figure 1:
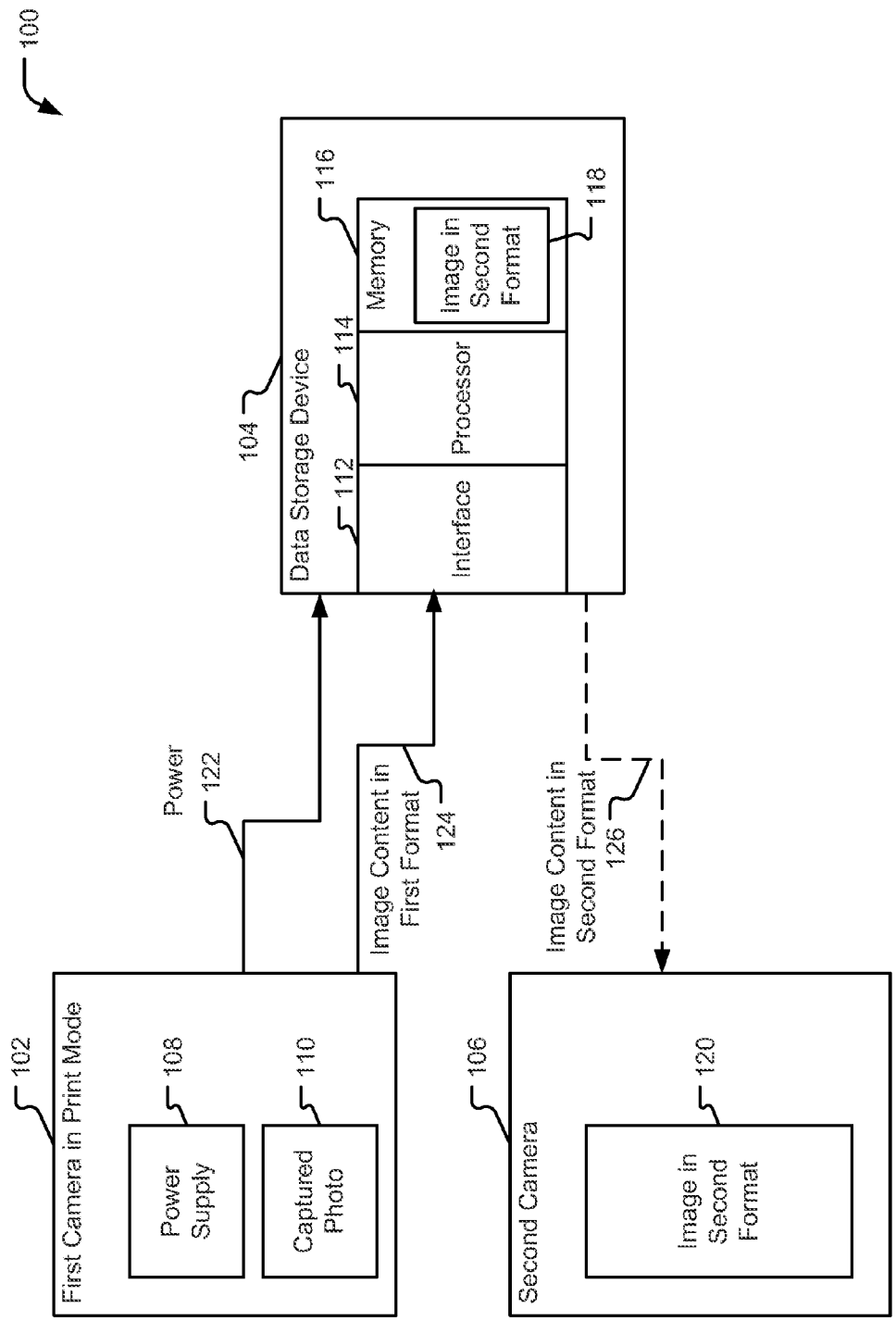
FIG. 1 is a block diagram of a first particular embodiment of a system to receive image content in a first format and store converted image content in a second format.

Referring to FIG. 1, a particular embodiment of a system to receive image content in a first format and store converted image content in a second format is depicted and generally designated 100. The system 100 includes a first camera 102, a data storage device 104, and a second camera 106. The first camera 102 includes a power supply 108 and a captured photograph 110. The first camera 102 is operatively coupled to the data storage device 104. The data storage device 104 includes an interface 112 that is coupled to the first camera 102 to receive image content in a first format 124 from the first camera 102. The interface 112 of the data storage device 104 is internally coupled to a processor 114. The processor 114 is coupled to a memory 116 configured to store an image in a second format 118 converted from the image content in the first format 124 received from the first camera 102. The memory 116 is sized to be able to store at least one complete image in a second format 118 in the memory 116. After the converted image is stored, the data storage device 104 may be coupled to the second camera 106 via the interface 112. For example, the data storage device may be removed from a connector of the first camera 102 and attached to a connector of the second camera 106. Image content in the second format 126 may be selectively transferred from the memory 116 of the data storage device 104 to the second camera 106. The captured photo 110 stored in the first camera is thus copied to the second camera 106 as an image in a second format 120.

The data storage device 104 is removably connectable via the interface 112 to the first camera 102 to receive image content in the first format 124 representing the captured photo 110 stored in the first camera 102. The interface 112 may include one or more electrical connectors and may provide compatibility with one or more removable devices that conform to device standards, such as Secure Digital™ (SD), microSD™, or CompactFlash™ (CF). Alternately or additionally, the interface 112 may be coupled to the first camera 102 using a connector conforming to one or more data communications protocols, such as one of the Universal Serial Bus™ (USB) protocols.

The interface 112 may include a controller, such as dedicated circuitry, one or more processors, or any combination thereof, that is operative to translate between physical layer signals and application specific messages. As a specific example, the interface 112 may be compatible with the Universal Serial Bus 2.0 Specification, Revision 2.0, (USB 2.0 Specification) such that the image content is received by the interface 112 via differential signaling along bus lines coupled to connector pins 2 and 3 as designated by the USB 2.0 Specification. As another example, the interface 112 also may be compatible with the Universal Serial Bus 3.0 Specification, Standard A (USB 3.0 Specification), such that the image content is received by the interface 112 via data transfer using differential signaling along bus lines coupled to connector pins 5 and 6 as designated by the USB 3.0 Specification. Different forms of USB connectors, including Type A, Type B, Mini-A, Mini-B, Micro-AB, and Micro-B connectors corresponding to available interfaces on the first camera 102 and the data storage device 104, may be used. The data storage device 104 thus may be coupled to the first camera 102 via the interface 112 to receive image content 124 from the first camera 102.

The data storage device 104 may also receive power 122 via the interface 112 from the power supply 108 of the first camera 102 when the first interface 112 is coupled to the first camera 102. For example, using the USB protocol, the interface 112 may electrically engage pins 1 and 4 of a USB 2.0 or a USB 3.0 connector that is coupled to power and ground connections (not shown in FIG. 1) of the power supply 108 of the first camera 102. The power 122 received via the interface 112 is supplied to the processor 114 and to the memory 116 to enable format conversion and storage of the image content 118 to the memory 116. The power supply 108 of the first camera 102, when accessible by a USB connector on the first camera 102, may be a direct current power supply outputting less than about six volts. The data storage device 104 may not have an on-board power supply or a separate power interface and may operate using only the power 122 received from the power supply 108 via an electrical connection over the interface 112. Alternately, the data storage device 104 may include an internal power source, such as a battery (not shown in FIG. 1), to provide power for the interface 112, the processor 114, and the memory 116 of the data storage device 104.

The image content 124 is received at the data storage device 104 in a first format, such as a Picture Transfer Protocol (PTP) format developed by the International Imaging Industry Association for transfer of images from a digital camera. PTP is a transport layer protocol, in contrast to USB, which is a physical layer protocol. Alternatively, or in addition, the first format may be a Camera and Imaging Products Association (CIPA) DC-001-2003 compliant format, also known as a PictBridge compliant format, which operates as an application layer residing over the transport layer and exchanges data using a USB connection. The first format may be compliant with a digital print order format (DPOF). For example, the first format may be compatible with a direct camera to printer connection.

The data storage device 104 may be a lightweight portable device. For example, the data storage device 104 may have a shape and a size that is compliant with a flash memory card specification, such as a size and form factor that is compliant with standards for a CompactFlash (CF) memory card. A CF memory card has outer dimensions of 43 mm by 36 mm by 3.3 mm (CF Type I) or 5 mm (CF Type II), thus a data storage device 104 having dimensions of a CF memory card would be easily portable. Alternatively, the data storage device 104 may have a shape and size form factor that is compliant with standards for a secure digital (SD) flash memory card. Alternatively, the data storage device 104 may have a shape and size form factor that is compliant with standards for a microSD flash memory card.

For purposes of the following illustration, the first camera 102 is assumed to support a PictBridge compliant format that enables the first camera 102 to transfer image data directly to a printer to output data for selected images, as further described below. The selected image data is transferred from the first camera 102 via the data storage device 104 to the second camera 106 using a USB 2.0 or a USB 3.0 connection. Part of the PictBridge protocol involves the sending device (i.e., the camera that is performing the printing) to query the printer to determine its print specification capabilities. As further described herein, the data storage device 104 emulates a printer to the first camera 102. In causing the interface 112 to identify the data storage device 104 as a printer, the processor 114 also provides selected specification capabilities to receive image data. For example, the processor 114 may provide specification capabilities via the interface that may be used to receive data to convert into, for example, a Joint Photographic Experts Group (JPEG) format. The data storage device 104 lacks printing functionality, but the data storage device 104 emulates a printer to be able to receive the image content in a first format 124 from the first camera 102 when the first camera 102 operates in a printing mode.

With the data storage device 104 coupled to the first camera 102, the image content is transferred to the data storage device 104 from the first camera 102 when the first camera 102 is operating in a print mode. In a print mode, such as a mode used by the PictBridge compliant first camera 102, the first camera 102 operates as a USB host.

According to the USB protocol, when a device is connected to a host, the host performs bus enumeration to which the device responds by communicating a device description on the data lines of the USB connection. However, instead of identifying itself as a Mass Storage device (e.g., a USB Class 08h device) and functioning as a Mass Storage device, when the data storage device 104 is coupled to the first camera 102, the processor 114 of the data storage device 104 causes the interface 112 to identify the data storage device 104 as a printer (e.g., a USB Class 07h device). Thus, the first camera 102 recognizes the data storage device 104 as a printer and may automatically enter a PictBridge compliant print mode or may enable the user to switch the first camera 102 to a PictBridge compliant print mode. In the PictBridge compliant print mode, the first camera 102 communicates the image data for selected images as though the first camera 102 is coupled to a printer.

The data storage device 104 emulates a printer for purposes of transferring the image data for selected images to exploit the PictBridge compliant printing capability or other printing capability of the first camera 102. The data storage device 104 emulates a printer so that the first camera 102 enters the print mode to enable user selection of one or more images to be printed. In a print mode, the first camera 102 may display captured images on a camera display screen (not shown in FIG. 1) such that, by operating controls on the first camera 102, the user can select an image to be sent for printing on a printer that the interface 112 has indicated is attached to the first camera 102. In sending an image to what the first camera 102 regards as a printer, the first camera 102 may transmit packets of data that constitute the image content in the first format 124. Upon receiving the data packets, the processor 114 may cache or temporarily store the image content in the first format 124 and generate and send a packet acknowledgement to the first camera 102. As the first camera 102, acting as a host device, continues to generate packets of the image content in the first format 124, the processor 114 may continue to cache the data packets and send acknowledgements until the processor 114 has received all the data for the image content in the first format 124.

The processor 114 is configured to process the received image content in the first format 124 to generate converted image content in a second format 118. For example, the second format may include a JPEG format. The processor 114 may cause the received image content in the first format 124 to be converted to a JPEG format. For example, the processor 114 may present the image content in the first format 124 to a JPEG converter included in the processor 114. The processor 114 causes the resulting JPEG image to be stored as the image in the second format 118 in the memory 116 of the data storage device 104. By converting the image content in the first format 124 to a JPEG file format, the image data may be compressed and stored in the compressed format for transfer to the second camera 106.

The memory 116 may be a non-volatile memory, such as a flash memory. When the memory 116 is a non-volatile memory and the data storage device 104 receives power 122 via the interface 112 from the first camera 102 instead of from an internal power source (not shown in FIG. 1), the use of a non-volatile memory enables the stored image in the second format 118 to be maintained in the memory 116 when the interface 112 is removed from the first camera 102. The non-volatile memory 116 may be in the form of a non-volatile memory card, such as an SD memory card, a microSD memory card, or a CF memory card.

The user may remove the data storage device 104 from the first camera 102 and may couple the data storage device 104 to another electronic device having a USB interface or other compatible interface, such as the second camera 106. For example, when the data storage device 104 has a shape and size compliant with a memory device such as a memory card, the data storage device 104 may be removed from the first camera 102 and then inserted into the second camera 106. When the data storage device 104 is coupled to a USB connector or other data communications interface on the first camera 102, the data storage device 104 may be disconnected from the first camera 102 and connected to the second camera 106.

Upon coupling the data storage device 104 to the second camera 106, the data storage device 104 becomes a host to the second camera 106. Coupling the data storage device 104 to the second camera 106 enables the image content stored in the memory 116 to be selectively outputted to the second camera 106 (or to another electronic device, as described with reference to FIG. 3). The stored image in the second format 118, such as a compressed JPEG format, may be transferred to the second camera 106 when the interface 112 of the data storage device 104 is coupled to the second camera 106. With the data storage device 104 acting as a host to the second camera 106, the second camera 106 acts as a Mass Storage device (e.g., USB Class 08h device) to receive the image in the second format 118 from the data storage device 104. The processor 114 may transmit the image in the second format 118 via the interface 112 to the second camera 106, such as in the form of packets of image data. The second camera 106 may receive the packets from the interface 112, store the packets of the image in a second format 120 in the second camera 106, and acknowledge receipt of the packets to the data storage device until the second camera 106 has received the entirety of the image in the second format 120.

The data storage device 104 may transfer the image in the second format 118 to other devices via the interface 112. For example, the image in the second format 118 may be transferred to another device that is a USB Class 08h Mass Storage device or that presents itself as a USB Class 08h Mass Storage device. Thus, other devices that can receive the image in the second format 118 include the second camera 106, a media player, or another device generating a device identification presenting itself as a USB Class 08h Mass Storage device when coupled to the interface 112 of the data storage device 104 acting as host device.

Figure 2:
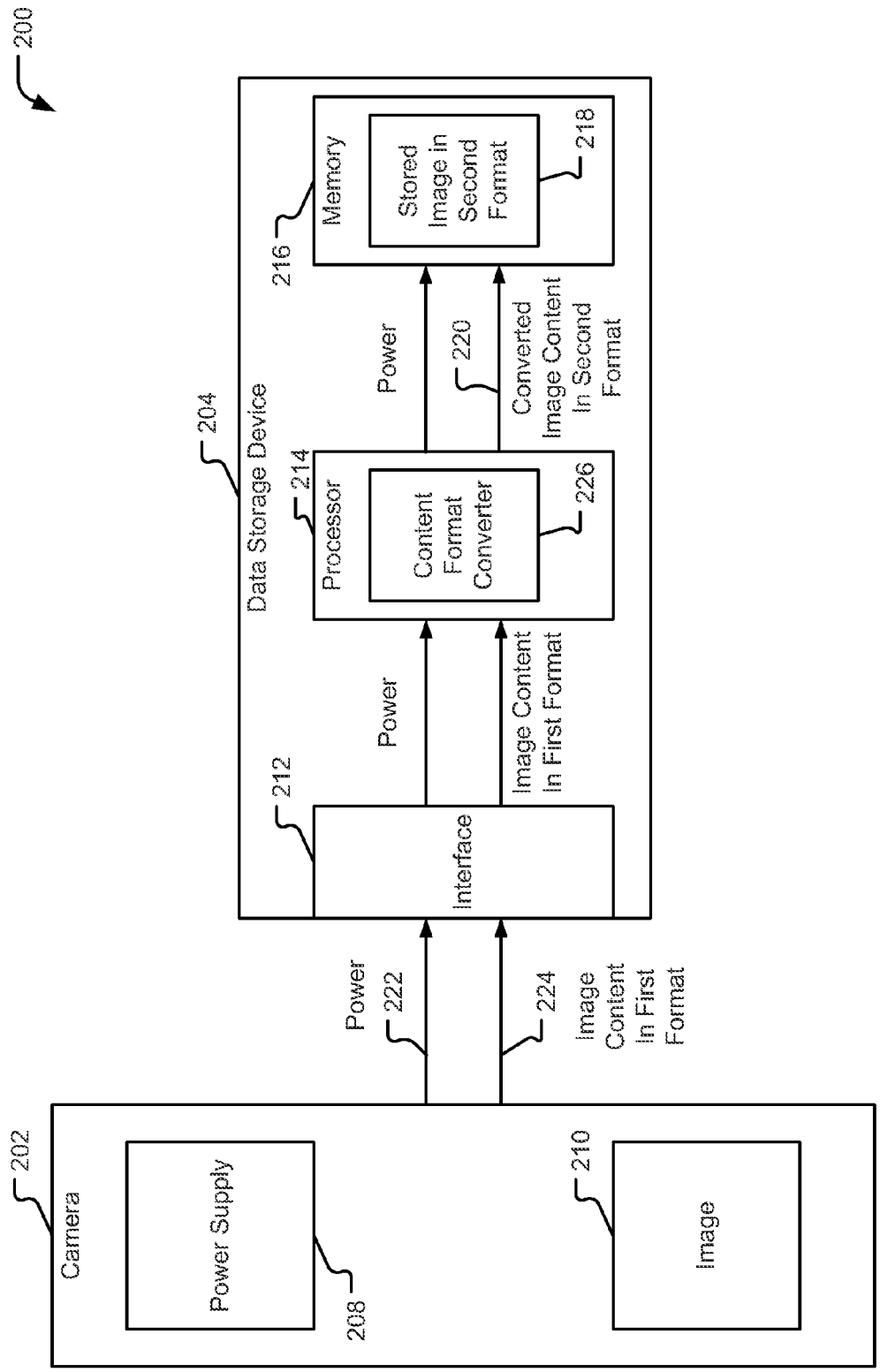
FIG. 2 is a block diagram of a second particular embodiment of a system to receive image content in a first format and store converted image content in a second format.

Referring to FIG. 2, a particular embodiment of a system to receive image content in a first format and store converted image content in a second format is depicted and generally designated 200. The system 200 includes a camera 202 operatively coupled to a data storage device 204. The camera 202 includes a power supply 208 and a captured image 210. The data storage device 204 includes an interface 212 coupled to a processor 214. The processor 214 includes a content format converter module 226. The processor 214 is coupled to a memory 216 that is configured to store an image in a second format 218.

The interface 212 is removably connectable to the camera 202 to receive image content in a first format 224 from the camera 202. As in the case of the system 100 of FIG. 1, the interface 212 may include one or more electrical connectors and may provide compatibility with one or more removable devices that conform to device standards, such as SD, microSD, or CF, or with one or more data communications protocols, such as a USB protocol. The interface 212 may include a controller, such as dedicated circuitry, one or more processors, or any combination thereof, that is operable to translate between physical layer signals and application specific messages. In addition to receiving the image content in the first format 224 from the camera 202, the interface 212 of the data storage device 204 may also receive power 222 from the camera 202 when the interface 212 is coupled to the camera 202. The power 222 may be received, for example, from designated pins of a USB connector, as described with reference to FIG. 1. When the interface 212 receives power from the camera 202, the interface 212 provides the power 222 to the processor 214 and to the memory 216. Alternately, the data storage device 204 may include an internal power source (not shown in FIG. 2) to provide power for the interface 212, the processor 214, and the memory 216 of the data storage device 204.

The image content in the first format 224 may include data in a PTP compliant format or a PictBridge compliant format. Alternatively, or in addition, the image content in the first format 224 may include data that is DPOF compliant.

As described with reference to FIG. 1, with the data storage device 204 coupled to the camera 202, the image content in the first format 224 is transferred to the data storage device 204 from the camera 202 with the camera 202 operating in a print mode and with the data storage device 204 emulating a printer. When the interface 212 is coupled to a PictBridge interface or another interface of the camera 202, the processor 214 causes the interface 212 to identify the data storage device 204 as a printer. As described with reference to FIG. 1, for example, the processor 214 causes the interface 212 to provide a USB class identifier for a printer to cause or enable the camera 202 to enter a print mode to enable the user to select an image to be printed. In a print mode, the camera 202 displays captured images on a camera display screen (not shown in FIG. 2) such that, by operating controls on the camera 202, the user can select an image to be sent for printing. In sending an image to what the camera 202 regards as a printer, packets of data bearing the image content in the first format 224 are transmitted to the interface 212 of the data storage device 204.

The processor 214 is configured to process the received image content in the first format 224 to generate converted image content in a second format 220. For example, the processor 214 may receive image content in the first format 224 via the interface 212 and present the image content in the first format 224 to a content format converter module 226 associated with the processor 214. The content format converter module 226 may include a JPEG encoder. The content format converter module 226 may include a hardware-based converter. Alternately, the content format converter module 226 may include a JPEG conversion software module executable by the processor 214. The content format converter module 226 converts the received image content in the first format 224 to the converted image content in the second format 220. The processor 214 causes the converted image content in the second format 220 to be stored in the memory 216 as a stored image in the second format 218.

The memory 216 may be a non-volatile memory, such as a flash memory. When the memory 216 is a non-volatile memory and the data storage device 204 receives power 222 via the interface 212 from the camera 202 instead of from an internal power source (not shown in FIG. 2), the use of a non-volatile memory enables the stored image in the second format 218 to be maintained in the memory 216 when the interface 212 is removed from the camera 202. The non-volatile memory may be in the form of a non-volatile memory card, such as an SD memory card, a microSD memory card, or a CF memory card.

Once the image content in first format 224 has been received, converted, and stored in the data storage device 204, the data storage device 204 may be used to transfer the stored image in the second format 218 to another electronic device having a compatible interface (not shown in FIG. 2). For example, when the data storage device 204 has a shape and size compliant with a memory device, the data storage device 204 may be removed from the camera 202 and then inserted in another electronic device. When the data storage device 204 is coupled to a USB connector or other data communications interface on the camera 202, the data storage device 204 may be disconnected from the camera 202 and connected to another electronic device. Upon coupling the data storage device 204 to another electronic device, the data storage device 204 becomes a host to the electronic device so that the image in the second format 218 may be copied from the data storage device 204 to the electronic device.

Figure 3:
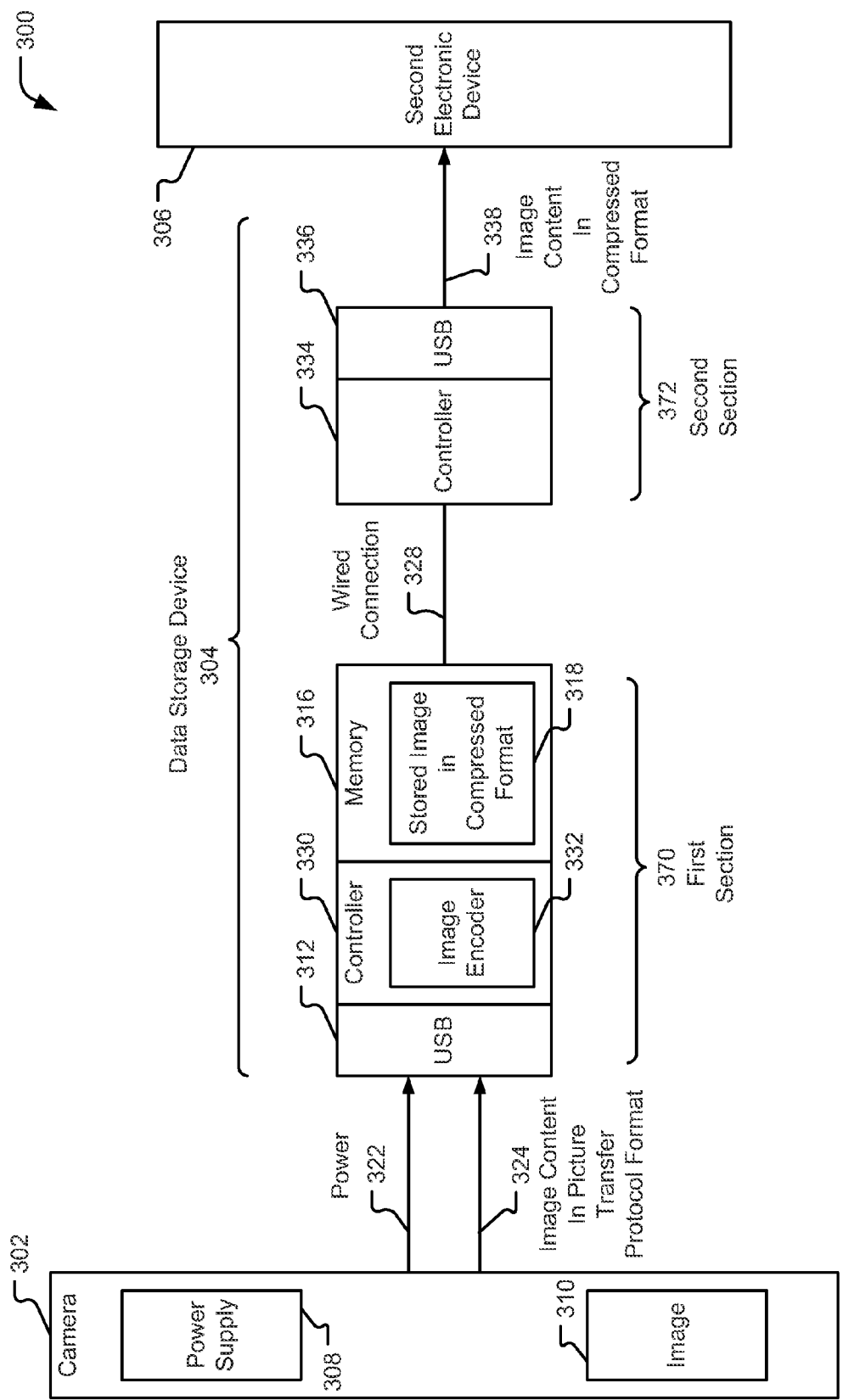
FIG. 3 is a block diagram of a third particular embodiment of a system to receive image content in a first format and store converted image content in a second format.

Referring to FIG. 3, a particular embodiment of a system to receive image content in a first format and store converted image content in a second format is depicted and generally designated 300. The system 300 includes a camera 302, a data storage device 304, and a second electronic device 306.

The camera 302 includes a power supply 308 and a captured image 310. The camera 302 is operatively coupled to the data storage device 304. The data storage device 304 includes a first interface 312, such as a USB interface, coupled to a first controller 330. The first interface 312 is configured to receive image content in a first format 324, such as image content in a Picture Transfer Protocol (PTP) format, from the camera 302. The first controller 330 includes an image encoder 332. The first controller 330 is coupled to a memory 316 configured to store an image in a compressed format 318, such as a JPEG format. The memory 316 is coupled to a second controller 334 via a wired connection 328. The second controller 334 is configured to receive the stored image in the compressed format 318 and to present the stored image in the compressed format 318 to a second interface 336. The second interface 336, such as a USB interface, couples the data storage device 304 to the second electronic device 306. The second interface 336 may include a USB interface. The second interface 336 communicates image content in the compressed format 338 to the second electronic device 306.

The data storage device 304 may be regarded as having three sections. The first section encompasses the first interface 312, the first controller 330, and the memory 316. The second section 372 includes the second controller 334 and the second interface 336. The third section is the wired connection 328. The three sections 370, 372, 328 may be encompassed in a single body or the first section 370 and the second section 372 may comprise separate physical devices coupled by the wired connection 328.

The first interface 312 is removably connectable to the camera 302 to receive the image content in the first format 324 from the camera 302. As in the case of the interfaces of system 100 of FIG. 1 and system 200 of FIG. 2, the first interface 312 may be a USB interface that includes a USB connector or the first interface 312 may include another interface and connector compatible with another communications protocol. Alternatively, the first interface 312 may provide compatibility with one or more removable devices that conform to device standards, such as SD, microSD, or CF. The first interface 312 may include a controller, such as dedicated circuitry, one or more processors, or any combination thereof, that is operative to translate between physical layer signals and application specific messages.

In addition to receiving the image content in the first format 324 from the camera 302, the first interface 312 of the data storage device 304 may also receive power 322 from the camera 302 when the first interface 312 is coupled to the camera 302. The power 322 may be received, for example, from designated pins of a USB connector, as described with reference to FIG. 1. The first interface 312 supplies the power 322 to the first controller 330 and to the memory 316. In addition, the power 322 may be supplied via the wired connection 328 to the second controller 334 and to the second interface 336 in the second section 372. Alternatively, the second interface 336 may be coupled to receive power from a power source in the second electronic device (not shown in FIG. 3) to provide power to the data storage device 304. Alternately, or additionally, the data storage device 304 may include an internal power source (not shown in FIG. 3) to provide power for the first interface 312, the first controller 330, the memory 316, and, via the wired connection 328, to the second controller 334 and the second interface 336.

The image content in the first format 324 may use a PTP compliant format or a PictBridge compliant format. Alternatively, or in addition, the first format may be digital print order format (DPOF) compliant.

As described with reference to FIGS. 1 and 2, with the data storage device 304 coupled to the camera 302, the image content in the first format 324 is transferred to the data storage device 304 from the camera 302 with the camera 302 operating in a print mode and with the data storage device 304 emulating a printer via the first interface 312. When the first interface 312 is coupled to a PictBridge interface or another interface of the camera 302, the first controller 314 causes the first interface 312 to identify the data storage device 304 as a printer. As described with reference to FIGS. 1 and 2, for example, the first controller 314 causes the first interface 312 to provide a USB class identifier for a printer to cause or enable the camera 302 to enter a print mode to enable the user to select an image to be printed. In a print mode, the camera 302 displays captured images on a camera display screen (not shown in FIG. 3) such that, by operating controls on the camera 302, the user can select an image to be sent for printing. In sending an image to what the camera 302 regards as a printer, packets of data bearing the image content in the first format 324 are transmitted to the first interface 312 of the data storage device 304.

The first controller 330 presents the received image content in the first format 324 to an image encoder 332 that is configured to convert the image data to a second format, which may include a compressed format such as a JPEG format. The first controller 330 directs the image data in the second format to be stored in the memory 318 as a stored image in the compressed format 318. When the memory 316 is a non-volatile memory and the data storage device 304 receives power 322 via the first interface 312 from the camera 302 instead of from an internal power source (not shown in FIG. 3), the use of a non-volatile memory enables the stored image in the compressed format 318 to be maintained in the memory 316 when the first interface 312 is removed from the camera 302. The non-volatile memory may be in the form of a non-volatile memory card, such as an SD memory card, a microSD memory card, or a CF memory card.

The second interface 336 may be coupled to the second electronic device 306. As previously described, the second interface 336 may include a USB connector or another connector compatible with another communications protocol. Alternatively, the second interface 336 may provide compatibility with one or more removable devices that conform to device standards, such as SD, microSD, or CF. The second interface 336 may include a controller, such as dedicated circuitry, one or more processors, or any combination thereof, to translate between physical layer signals and application specific messages.

The second interface 336 is used to selectively output the image content in the compressed format 318, received from the memory 316 via the wired connection 328, to the second electronic device 306. The second controller 334 may receive power via the wired connection 328 where the power 322 is received via the first interface 312 from the camera 302 or where power is supplied by an internal power source (not shown in FIG. 3) within the data storage device 304. The second controller 334 receives the image content in the compressed format 318 via the wired connection 328 and transfers image content in the compressed format 338 to the second electronic device 306. The second interface 336, under the direction of the second controller 334, presents the data storage device 304 as a host to the second electronic device 306, and the second electronic device 306 is used as a Mass Storage device to receive the image content in the second format 338.

The second electronic device 306 may include a second camera that is a different type of camera than the camera 302. For example, the camera 302 and the second electronic device 306 may be manufactured by different entities. Alternatively, the second electronic device 306 may be another type of electronic device, such as a mobile phone, a personal digital assistant, a personal computer, a gaming device, or a multimedia player. As previously described, the second electronic device 306 may be a mass storage device, as supported by the USB specification.

Figure 4:
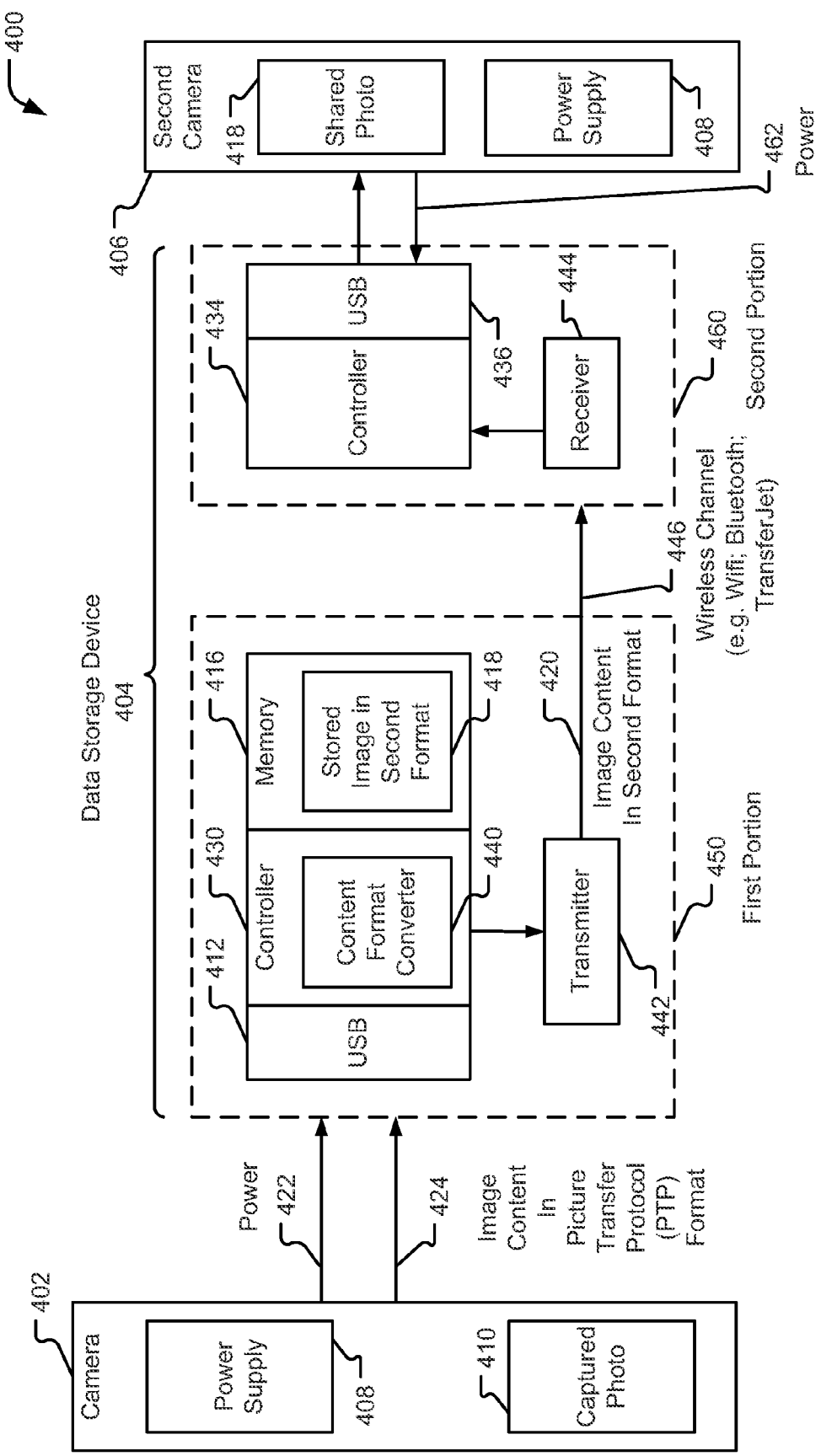
FIG. 4 is a block diagram of a fourth particular embodiment of a system to receive image content in a first format and store converted image content in a second format.

Referring to FIG. 4, a particular embodiment of a system to receive image content in a first format and store converted image content in a second format is depicted and generally designated 400. The system 400 includes a first camera 402, a data storage device 404, and a second electronic device, such as a second camera 406. The data storage device 404 includes a first portion 450 and a second portion 460 that communicate via a wireless channel 446. The first portion 450 and the second portion 460 may be pre-paired to be receptive to communications from one another or may be otherwise compatible to communications between the first portion 450 and the second portion 460.

The first camera 402 includes a power supply 408 and a captured photo 410, which may be one of a plurality of captured photos stored at the first camera 402. The first camera 402 is operatively coupled to the data storage device 404. The data storage device 404 includes a first interface 412, such as a USB interface, coupled to a first controller 430. The first interface 412 is configured to receive image content in a first format 424 from the first camera 402. The first controller 430 includes a content format converter 440. The controller 430 is coupled to a memory 416 configured to store an image in a second format 418. The controller 430 is also coupled with a transmitter 442 to wirelessly transmit image content in the second format 420 via the wireless channel 446 to a receiver 444 included in the second portion 460 of the data storage device 404.

The wireless channel 446 may be compliant with an open wireless protocol for exchanging data over short distances, such as the Institute for Electrical and Electronics Engineers (IEEE) 802.11 standard, commonly described as the Wi-Fi™ standard. Alternatively, the wireless channel 446 may be compliant with a wireless protocol for exchanging data, such as the IEEE 802.15 standard known as the Bluetooth™ standard. Alternatively, the wireless channel 446 may be compliant with close proximity (i.e., about three centimeters) wireless transfer technology that enables high speed transfer of data, such as TransferJet™ standard adopted by the TransferJet consortium. The wirelessly transmitted image content in the second format 420 is received by the receiver 444. The receiver 444 is coupled to the second controller 434, enabling the wireless file sharing of images between the first camera 402 and the second camera 406.

The second controller 434 is configured to receive the image content in the second format 420 from the receiver 444 and to present the stored image in the second format 418 to a second interface 436. The second interface 436, such as a USB interface, couples the second portion 460 of the data storage device 404 to the second camera 406. The second interface 436 communicates image content in the second format 420 to the second camera 406.

The first interface 412 is removably connectable to the first camera 402 to receive the image content in the first format 424 from the first camera 402. As in the case of the interfaces of FIGS. 1-3, the first interface 412 may include a USB connector or another connector compatible with another communications protocol. Alternatively, the first interface 412 may provide compatibility with one or more removable devices that conform to device standards, such as SD, microSD, or CF. The first interface 412 may include a controller, such as dedicated circuitry, one or more processors, or any combination thereof to translate between physical layer signals and application specific messages. In addition to receiving the image content in the first format 424 from the first camera 402, the first interface 412 of the data storage device 404 also may receive power 422 from the first camera 402 when the first interface 412 is connected to the first camera. The power 422 may be received, for example, from designated pins of a USB connector, as described with reference to FIG. 1. The first interface 412 passes the power 422 to the first controller 430, the memory 416, and the transmitter 442. Alternately, or additionally, the first portion 450 of the data storage device 404 may include an internal power source (not shown in FIG. 4) to provide power for the first interface 412, the first controller 430, the memory 416, and the transmitter 442.

The image content in the first format 424 may use a PTP compliant format or a PictBridge compliant format. Alternatively, or in addition, the first format may be digital print order format (DPOF) compliant.

As described previously with reference to FIGS. 1-3, with the data storage device 404 coupled to the first camera 402, the image content in the first format 424 is transferred to the data storage device 404 from the first camera 402 with the first camera 402 operating in a print mode and with the data storage device 404 emulating a printer. When the first interface 412 is coupled to a PictBridge interface or another interface of the first camera 402, the first controller 430 causes the first interface 412 to identify the data storage device 404 as a printer. As described with reference to FIGS. 1 and 2, for example, the first controller 430 causes the first interface 412 to provide a USB class identifier for a printer to cause or enable the first camera 402 to enter a print mode to enable the user to select an image to be printed. In a print mode, the first camera 402 displays captured images on a camera display screen (not shown in FIG. 4), such that, by operating controls on the first camera 402, the user can select one or more images to be sent for printing. In sending an image to what the first camera 402 regards as a printer, packets of data bearing the image content in the first format 424 may be received at the first interface 412 of the data storage device 404.

The first controller 430 presents the received image content in the first format 424 to a content format converter 440 that is configured to convert the image data to a second format. The first controller 430 directs the image data in the second format to be stored in the memory 416 as a stored image in a second format 418. The memory 416 is a non-volatile memory such as a flash memory. When the memory 416 is a non-volatile memory and the data storage device 404, for example, receives power 422 via the first interface 412 from the first camera 402 instead of from an internal power source (not shown in FIG. 4), the use of a non-volatile memory enables the stored image in the second format 418 to be maintained in the memory 416 when the first interface 412 is removed from the first camera 402. The non-volatile memory may be in the form of a non-volatile memory card, such as an SD memory card, a microSD memory card, or a CF memory card.

The first controller 430 provides content from the stored image in the second format 418 and control signals to the transmitter 442 to be sent to the receiver 444 in the second portion 460 of the data storage device 404. The second controller 434 provides control signals to the receiver 444 to direct the receiver 444 to receive data from the transmitter 442. The second controller 434 also sends control signals via the second interface 436 to the second camera 406 to prepare the second camera 406 to receive the data. In addition, although the wireless communication device in the first portion 450 of the data storage device 404 is designated as a transmitter 442, in some implementations the transmitter 442 also may receive control signals over the wireless channel 446 from the receiver 444, such as ready to receive signals and packet acknowledgement signals. Corresponding, although the communication device in the second portion 460 of the data storage device 404 is designated as a receiver 444, in some implementations the receiver 444 may also transmit control signals to the transmitter 442 in the first portion 450 of the data storage device 404.

Alternately, the first portion 450 and the second portion 460 of the data storage device 404 may each be equipped with a transceiver (not shown in FIG. 4) instead of equipping the first portion 450 with the transmitter 442 and the second portion 460 with the receiver 444. If the first controller 430 and the second controller 434 are each configured to emulate a printer and a host device via the respective first and second interfaces 412, 436, the data storage device 404 may enable image data to be transferred from the second camera 406 to the first camera 402 in addition to allowing image data to be transferred from the first camera 402 to the second camera 406.

The second interface 436 is coupled to the second camera 406. As previously described, the second interface 436 may include a USB connector or another connector compatible with another communications protocol. Alternatively, the second interface 436 may provide compatibility with one or more removable devices that conform to device standards, such as SD, microSD, or CF. The first interface 436 may include a controller, such as dedicated circuitry, one or more processors, or any combination thereof to translate between physical layer signals and application specific messages.

The second interface 436 is used to selectively output the image content in the second format 420, received by the receiver 444 from the first controller 430 via the transmitter 442 and the wireless channel 446, to the second camera 406. The second controller 434 may receive power 462 via the second interface 436 from the second camera 406 to power the second controller 434, the second interface 436, and the receiver 444. Alternately, or additionally, the second portion 460 of the data storage device 404 may include an internal power source (not shown in FIG. 4) to provide power for the second portion 460 of the data storage device 404. The second interface 436, under the direction of the second controller 434, presents the data storage device 404 as a host to the second camera 406 and the second camera 406 is used as a Mass Storage device to receive the shared photo or the stored image in the second format 418. The second camera 406 may be a different type of camera than the first camera 402. For example, the first camera 402 and the second camera 406 may be manufactured by different entities.

Figure 5:
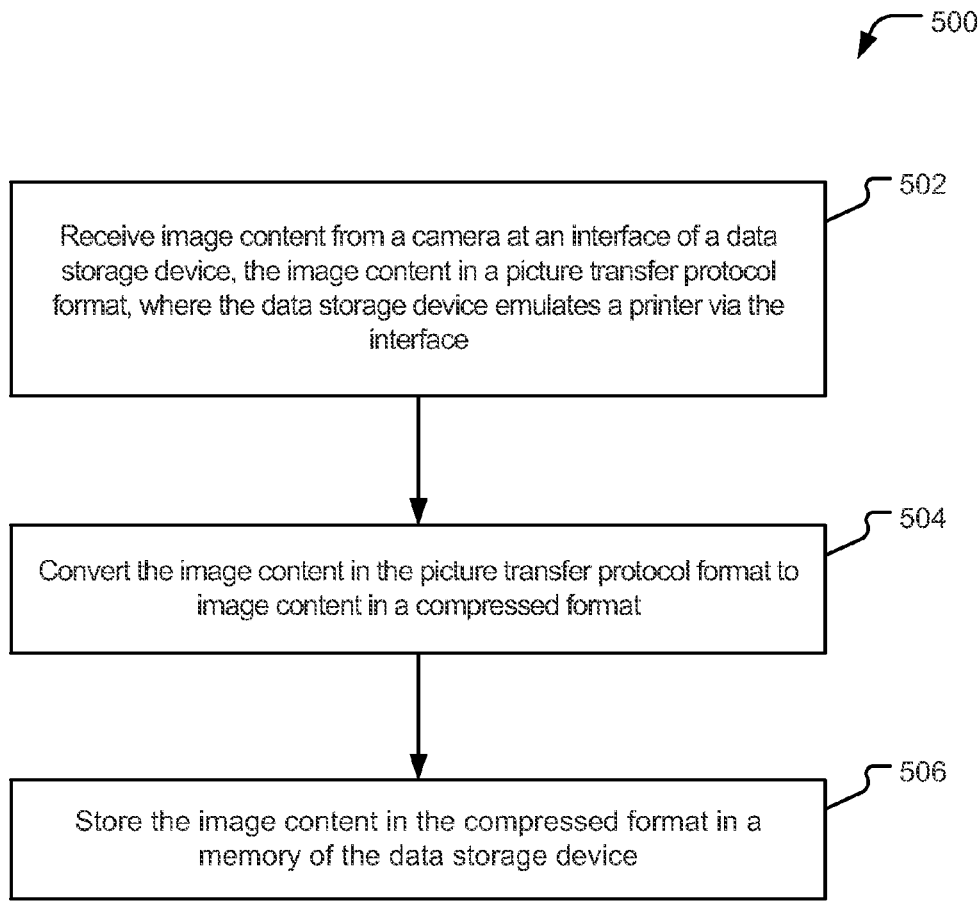
FIG. 5 is a flow diagram of a first particular embodiment of a method to receive image content in a first format and store converted image content in a second format.

Referring to FIG. 5, a flow diagram of an illustrative embodiment of a method of receiving image content in a first format and storing converted image content in a second format is depicted and generally designated 500. The method 500 may be performed by the data storage device 104 of the system 100 of FIG. 1, by the data storage device 204 of the system 200 of FIG. 2, by the data storage device 304 of the system 300 of FIG. 3, by the data storage device 404 of the system 400 of FIG. 4, by one or more other image content converting and storing systems or devices, or by any combination thereof.

Image content from a camera is received at an interface of a data storage device, where the image content is in a picture transfer protocol format and the data storage device emulates a printer via the interface, at 502. For example, the data storage device may lack printing functionality but may indicate to the camera that the data storage device is a printer device, such as a USB Class 07h device. As previously described with reference to FIGS. 1-4, the image content may be compliant with a PTP format, a PictBridge format, or DPOF. As illustrative, non-limiting examples, the first format may be compatible with a direct camera to printer connection. As also previously described, the interface may include one or more electrical connectors and may provide compatibility with one or more removable devices that conform to device standards, such as SD, microSD, or CF, or with one or more data communications protocols, such as one of the USB protocols. The interface may include a controller, such as dedicated circuitry, one or more processors, or any combination thereof to translate between physical layer signals and application specific messages. The data storage device draws power from the camera via the interface, for example, via pins 1 and 4 of a USB connection or by interfacing with contacts supplying power in another interface protocol.

The image content in a picture transfer protocol format is converted to image content in a compressed format, at 504. As previously described, the image content may be compressed by a processor (FIG. 1), by providing the image content to a content format converter (FIGS. 2 and 4), or to an image encoder (FIG. 3) one or more of which may be included within the data storage device.

The image content is stored in the compressed format in a memory of the data storage device, at 506. The memory, as previously described with reference to FIGS. 1-4, may include a memory 116, 216 coupled to a processor (FIGS. 1 and 2) or a memory 316, 416 coupled to a plurality of controllers (FIGS. 3 and 4). The memory may include a non-volatile memory to maintain the image content when power is no longer supplied to the data storage device, as in 502.

Figure 6:
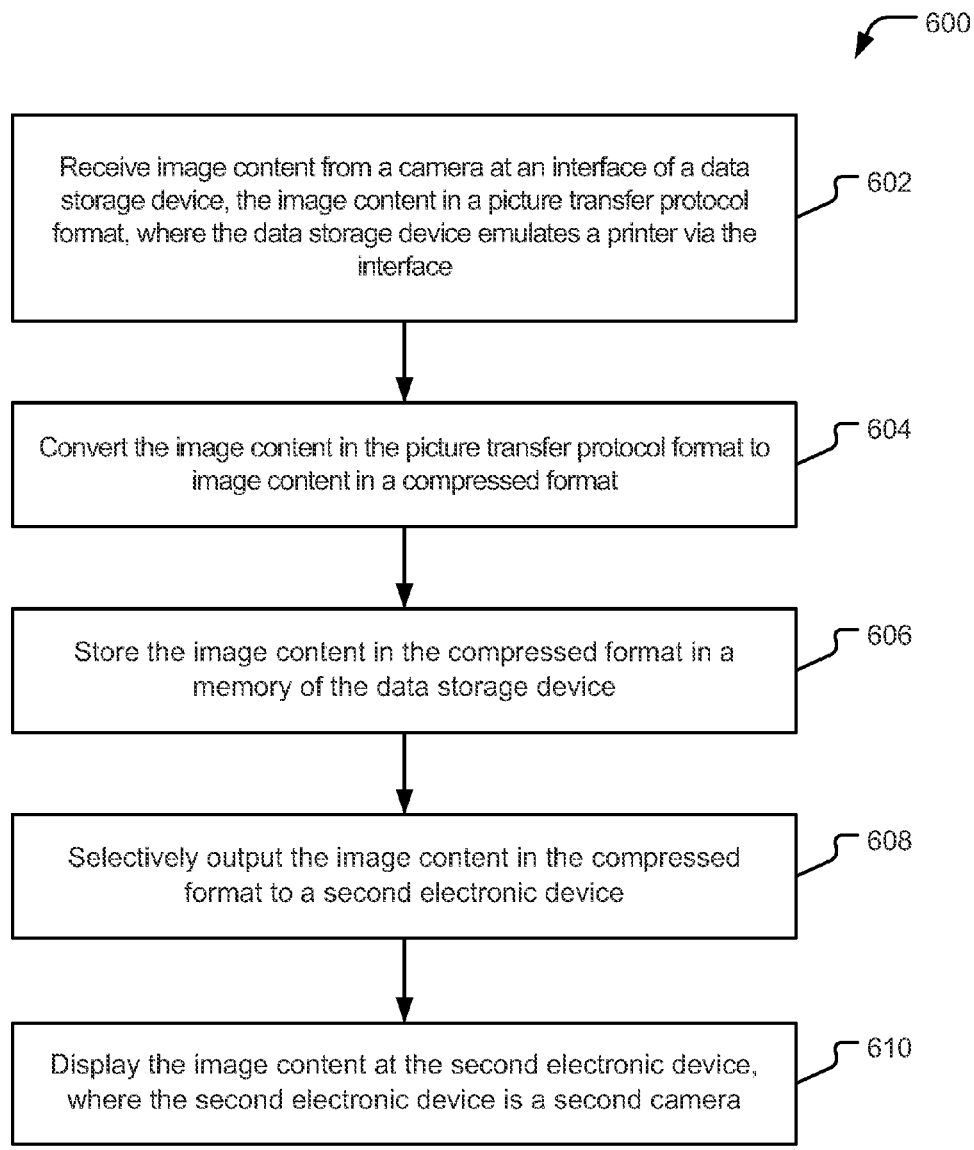
FIG. 6 is a flow diagram of a second particular embodiment of a method to receive image content in a first format and store converted image content in a second format.

Referring to FIG. 6, a flow diagram of a second illustrative embodiment of a method to receive image content in a first format and store converted image content in a second format is depicted and generally designated 600. The method 600 may be performed by the data storage device 104 of the system 100 of FIG. 1, by the data storage device 204 of the system 200 of FIG. 2, by the data storage device 304 of the system 300 of FIG. 3, by the data storage device 404 of the system 400 of FIG. 4, by one or more other image content converting and storing systems or devices, by or any combination thereof.

Image content from a camera is received at an interface of a data storage device in a picture transfer protocol (PTP) format where the data storage device emulates a printer via the interface, in 602. For example, the data storage device may lack printing functionality but may indicate to the camera that the data storage device is a printer device, such as a USB Class 07h device. As previously described with reference to FIGS. 1-4, the image content may be compliant with a PTP format, a PictBridge format, or DPOF. As illustrative, non-limiting examples, the first format may be compatible with a direct camera to printer connection. As also previously described, the interface may include one or more electrical connectors and may provide compatibility with one or more removable devices that conform to device standards, such as SD, microSD, or CF, or with one or more data communications protocols, such as one of the USB protocols. The interface may include a controller, such as dedicated circuitry, one or more processors, or any combination thereof, that is operative to translate between physical layer signals and application specific messages. The data storage device may draw power from the camera via the interface, for example, via pins 1 and 4 of a USB connection or by interfacing with contacts supplying power in another interface protocol. As also previously described, to receive the image content, the data storage device may cause the interface to identify the data storage device as a printer to cause or enable the camera to enter a print mode by which image data may be output to the interface.

The image content in a picture transfer protocol format is converted to image content in a compressed format, at 604. As previously described, the image content may be compressed by a processor (FIG. 1), by providing the image content to a content format converter (FIGS. 2 and 4), or to an image encoder (FIG. 3) one or more of which may be included within the data storage device. The processor, image content converter, or image encoder may compress the image content by using JPEG encoding or another form of image compression. Compressing image data may include, for example, performing color space transformation, downsampling, block splitting, discrete cosine transformation, quantization, and entropy coding.

The image content in the compressed format is stored in a memory of the data storage device, at 606. The memory, as previously described with reference to FIGS. 1-4, may include a memory 116, 216 coupled to a processor (FIGS. 1 and 2) or a memory 316, 416 coupled to a plurality of controllers (FIGS. 3 and 4). The memory may include a non-volatile memory to maintain the image content when power is no longer supplied to the data storage device.

The image content in the compressed format is selectively output to a second electronic device, at 608. For example, as described with reference to FIGS. 1 and 2, the data storage device 104, 204 may be removed from the first camera 102 and the data storage device 104, 204 may be coupled with a second camera 106 (FIG. 1) or a second electronic device 206 (FIG. 2). As described with reference to FIGS. 3 and 4, the data storage device 304 and 404 may be coupled to both a camera 302, 402 storing the image and to a destination device (e.g., the second electronic device 306, or the second camera 406). The image content may be transmitted over a wired connection 328 (FIG. 3) or over a wireless connection 446 to the destination device. A wireless connection, as previously described, may conform to IEEE 802.11 (Wi-Fi) or 802.15 (Bluetooth) specifications, may conform to the TransferJet™ standard, or conform to another standard.

The image content is displayed at the second electronic device where the second device includes another camera, at 612. Displaying an image from image content stored in a memory of a camera is widely known in the art. Because the image content displayed at the second camera is derived from image data stored on the first camera, while the image content may have been compressed or otherwise converted, the image content displayed at the second camera may be substantially similar to the image displayable at the first camera.

As described herein, embodiments of a data storage device 104, 204, 304, 404 and methods for receiving and storing an image from a camera interface enable one or more images stored on a camera to be shared with a user of a second camera or another electronic device. One or more images may be transferred to the data storage device 104, 204, 304, 404 via an interface on the camera as though the data storage device 104, 204, 304, 404 were an attached printer. The transferred image may be transferred to another camera or other electronic device where the transferred image can be stored and displayed.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
    an interface removably connectable to a camera to receive from the camera image content in a first format, wherein the image content is received at the interface from the camera when the camera is operating in a print mode;
    a processor coupled to the interface, the processor to process the received image content in the first format to generate converted image content in a second format;
    a non-volatile memory to store the converted image content in the second format; and a second interface to a second electronic device, the second interface to selectively output the image content in the second format to the second electronic device, wherein the data storage device emulates a printer via the interface.

2. The data storage device of claim 1, wherein the second electronic device comprises a second camera.

3. The data storage device of claim 2, wherein the camera is a different type of camera than the second camera.

4. The data storage device of claim 1, wherein the first format is digital print order format (DPOF) compliant.

5. The data storage device of claim 1, wherein the second electronic device is a mass storage device.

6. The data storage device of claim 1, wherein the interface is a first universal serial bus (USB) interface and the second interface is a second USB interface.

7. The data storage device of claim 1, wherein the interface and the second interface enable file sharing of images between the camera and the second electronic device.

8. The data storage device of claim 1, wherein the interface is coupled to the second interface over a wired connection.

9. The data storage device of claim 1, wherein the interface is coupled to the second interface over a wireless connection.

10. The data storage device of claim 9, wherein the wireless connection is a an Institute for Electrical and Electronics Engineers (IEEE) 802.11 compliant connection.

11. The data storage device of claim 9, wherein the wireless connection is an Institute for Electrical and Electronics Engineers (IEEE) 802.15 compliant connection.

12. The data storage device of claim 9, wherein the wireless connection is a TransferJet compliant connection.

13. The data storage device of claim 1, wherein the non-volatile memory is sized to store at least one complete image in the second format.

14. A method comprising:
receiving image content from a camera at an interface of a data storage device, the image content received in a picture transfer protocol format, wherein the data storage device emulates a printer via the interface;
converting the image content in the picture transfer protocol format to image content in a compressed format;
storing the image content in the compressed format in a memory of the data storage device; and
selectively outputting the image content in the compressed format to a second electronic device, wherein selectively outputting the image content comprises communicating data over a wireless channel.

* * * * *